(12) United States Patent
Nagasaka et al.

(10) Patent No.: US 7,210,861 B2
(45) Date of Patent: May 1, 2007

(54) OPTICAL CONNECTOR

(75) Inventors: Kimio Nagasaka, Yamanashi (JP); Akira Miyamae, Nagano (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/103,413

(22) Filed: Apr. 11, 2005

(65) Prior Publication Data
US 2005/0238294 A1   Oct. 27, 2005

(30) Foreign Application Priority Data
Apr. 26, 2004   (JP) .............................. 2004-130207

(51) Int. Cl.
*G02B 6/36*   (2006.01)
*G02B 6/42*   (2006.01)
*G02B 6/00*   (2006.01)

(52) U.S. Cl. .......................................... 385/88; 385/92

(58) Field of Classification Search ..................... None
See application file for complete search history.

(56) References Cited

U.S. PATENT DOCUMENTS

| | | | | |
|---|---|---|---|---|
| 4,539,476 A | * | 9/1985 | Donuma et al. | 250/227.24 |
| 5,661,832 A | * | 8/1997 | Yonemura | 385/88 |
| 6,722,793 B2 | * | 4/2004 | Althaus et al. | 385/92 |
| 6,817,781 B2 | * | 11/2004 | Ide | 385/88 |
| 6,908,235 B2 | * | 6/2005 | Kuhara | 385/88 |
| 7,070,339 B2 | | 7/2006 | Nagasaka | |
| 2004/0022487 A1 | | 2/2004 | Nagasaka | |
| 2004/0028349 A1 | | 2/2004 | Nagasaka | |
| 2004/0202477 A1 | | 10/2004 | Nagasaka | |

FOREIGN PATENT DOCUMENTS

| | | |
|---|---|---|
| JP | 2001-051162 | 2/2001 |
| JP | 2003-227970 | 8/2003 |
| JP | 2004-86136 | 3/2004 |

OTHER PUBLICATIONS

Nikkei BP, Kabushiki Kaisha, "Nikkei Electronics", Dec. 3, 2001 Issue, pp. 112-117 and 121-122 (2001)—with English translation.

* cited by examiner

*Primary Examiner*—Sung Pak
(74) *Attorney, Agent, or Firm*—Harness, Dickey & Pierce, P.L.C.

(57) ABSTRACT

An optical connector comprising a male connector that supports one end of an optical transmission medium, and a female connector composed to be engageable with the male connector. The female connector includes a photoelectric conversion module having a function that mutually converts an electrical signal and an optical signal, and a first housing that accommodates the photoelectric conversion module and has an opening that communicates with the photoelectric conversion module accommodated, and the male connector has at least one portion that is inserted in the housing of the female connector through the opening, a plug having a function to optically connect the optical transmission medium and the photoelectric conversion module and provided at one end of the optical transmission medium, and a second housing that has an enclosure section provided around the plug while maintaining a space from the plug, and accommodates the plug.

5 Claims, 7 Drawing Sheets

OPTICAL CONNECTOR

RELATED APPLICATIONS

This application claims priority to Japanese Patent Application No. 2004-130207 filed Apr. 26, 2004 which is hereby expressly incorporated by reference herein in its entirety.

BACKGROUND

1. Technical Field

The present invention relates to optical connectors that are used for systems that perform optical communications, and provide optical connection at coupling nodes of optical signals.

2. Related Art

Various telecommunications methods using electrical signals as media are standardized in order to perform mutual data communications among electronic equipments such as personal computers. For example, 10 BASE-T and 100 BASE-T according to the IEEE 802.3 standard are known as the telecommunications methods, which may be used for mutual data communications among computers, and among computers and peripheral equipments (for example, printers, and the like). In addition, higher transmission rates are desired along with the trend of performing data communications in a greater capacity in recent years. However, in the aforementioned communications methods using electrical signals as communications media, the greater the transmission rates, the more inconveniences are caused, such as, generation of crosstalk between signal lines as a result of transmission signals being made a high frequency, attenuation of the signal level by impedance mismatch, limitation of the length of cables, and the like. For this reason, it is considered to be difficult for the current technology to achieve high-speed communications at transmission rates that exceed 1 Gbps with practically reasonable costs. Under such circumstances, technologies that replace electrical signals that have so far been used as communications media with optical signals are examined. For example, such a technology has been described in a technical journal, Dec. 3, 2001 issue of "Nikkei Electronics" by Nikkei BP, Kabushiki Kaisha.

It is desired to suppress a cost increase associated with the use of the aforementioned technology in order to widely spread data communications with optical signals to household electronic appliances such as personal computers. However, it is undesirable to adopt optical connectors of the existing standards such as LC connectors and MT connectors in view of the costs. The reasons are as follows. In the MT connectors, an optical connection is established by mutually contacting ends of optical fibers, and therefore, the ends of the optical fibers need to be polished with a relatively high level of accuracy in order to secure a high optical coupling efficiency. When this polishing is conducted, in addition to the step of polishing ends of optical fibers, the steps of washing and testing are to be performed later, which would likely cause the yield to decrease, and becomes a factor to increase the cost. Moreover, because the position adjustment between connectors (between a female connector and a male connector) is conducted with guide pins, the number of parts increases, and the step of forming the guide pins is also needed, which becomes an obstruction to the cost reduction.

Accordingly, it is an object of the present invention to provide low-cost optical connectors that can be readily adopted for electronic equipments of household use.

SUMMARY

The present invention relates to an optical connector formed from a male connector that supports one end of an optical transmission medium, and a female connector composed to be engageable with the male connector, and has the following characteristics. That is, the female connector includes a photoelectric conversion module having a function that mutually converts an electrical signal and an optical signal, and a first housing that accommodates the photoelectric conversion module and has an opening that communicates with the photoelectric conversion module accommodated. The male connector has at least one portion that is inserted in the housing of the female connector through the opening, a plug having a function to optically connect the optical transmission medium and the photoelectric conversion module and provided at one end of the optical transmission medium, and a second housing that has an enclosure section provided around the plug while maintaining a space from the plug, and accommodates the plug. The optical connector in accordance with the present invention is structured to include these female and male connectors.

According to this structure, an optical coupling is established through a plug or the like without adopting the structure in which an optical connection is established by directly contacting ends of optical transmission media such as optical fibers. Therefore, ends of the optical fibers are not required to be polished in high accuracy, and a cost increase due to a decrease in the yield can be avoided.

Moreover, because guide pins are not used for position adjustment between the female and made connectors, the number of parts is reduced, and the step for forming the guide pins becomes unnecessary, whereby an increase in the cost can be avoided. Therefore, low-cost optical connectors that are readily adopted for electronic equipments of household use can be provided.

Preferably, the photoelectric conversion module may have a structure including a transparent substrate that has an optical transparency for a wavelength of the optical signal, an optical element that is disposed at one surface side of the transparent substrate, and emits the optical signal to another surface side of the transparent substrate in response to a supply of a current or a voltage, or outputs a current or a voltage according to an intensity of the optical signal that enters the transparent substrate from the other surface side; a reflector that is disposed on the other surface side of the transparent substrate, and changes a course of the optical signal emitted from the optical element by about 90 degrees to be conducted to the optical transmission medium, or changes a course of the optical signal emitted from the optical transmission medium to be conducted to the optical element; and a receptacle disposed on the other surface side of the transparent substrate for inserting the plug. Furthermore, it may be structured to have a circuit chip that controls emission of the optical element, and generates the electrical signal according to a current or a voltage that is outputted from the optical element.

According to this structure, miniaturization of an optical module becomes easy, and an optical module can be readily accommodated in a housing even when it is necessary to make the volume of the housing relatively small.

Preferably, the photoelectric conversion module further includes a lens that focuses the optical signal emitted from the optical element to be led to the reflector, or that focuses the optical signal emitted from the optical transmission medium and reflected by the reflector to be led to the optical element.

By this, the optical coupling efficiency can be improved.

Preferably, the plug further includes a lens that focuses the optical signal emitted from the optical element and reflected by the reflector to be led to the optical transmission medium, or that focuses the optical signal emitted from the optical transmission medium to be led to the reflector.

By this, the optical coupling efficiency can be improved.

Further, the plug may preferably be structured to include a reflection section that is disposed on an optical axis of the optical transmission medium, and changes a course of the optical signal emitted from the optical transmission medium by about 90 degrees to be conducted to the optical element, or changes a course of the optical signal emitted from the optical element to be conducted to the optical transmission medium, and the photoelectric conversion module may preferably be structured to include a transparent substrate that has an optical transparency for a wavelength of the optical signal, an optical element that is disposed at one surface side of the transparent substrate, and emits the optical signal to another surface side of the transparent substrate in response to a supply of a current or a voltage, or outputs a current or a voltage according to an intensity of the optical signal that enters the transparent substrate from the other surface side, and a receptacle disposed on the other surface side of the transparent substrate for inserting the plug. Furthermore, it may be structured to have a circuit chip that controls emission of the optical element, and generates the electrical signal according to a current or a voltage that is outputted from the optical element.

By this, the traveling direction of the optical signal that travels in and out between the plug and the photoelectric conversion module and the push/pull direction of the plug become generally orthogonal to each other, such that a structure in which the optical signal does not go out from the plug and the photoelectric conversion module can be obtained. This structure is desirable particularly from the viewpoint of protection of eyes (eye safety), and therefore suitable for applications to household electronic appliances.

Also, the male connector may preferably be formed to be moveable reciprocally along the optical axis of the optical transmission medium, and may preferably further include a force application device that applies a force to the plug toward the receptacle of the female connector.

By this structure, the plug is placed substantially in a floating state, such that external forces acting on the optical transmission medium and the male connector become difficult to transmit to the plug. Also, because the force application device applies a force to the plug, there is provided an effect in that the plug and photoelectric conversion module on the side of the female connector can be accurately positioned, and its state can be stably maintained.

BRIEF DESCRIPTION OF THE DRAWINGS

FIGS. 3(A) and (B) show views for describing the structure of a photoelectric conversion module in detail.

DETAILED DESCRIPTION

Figure 1:
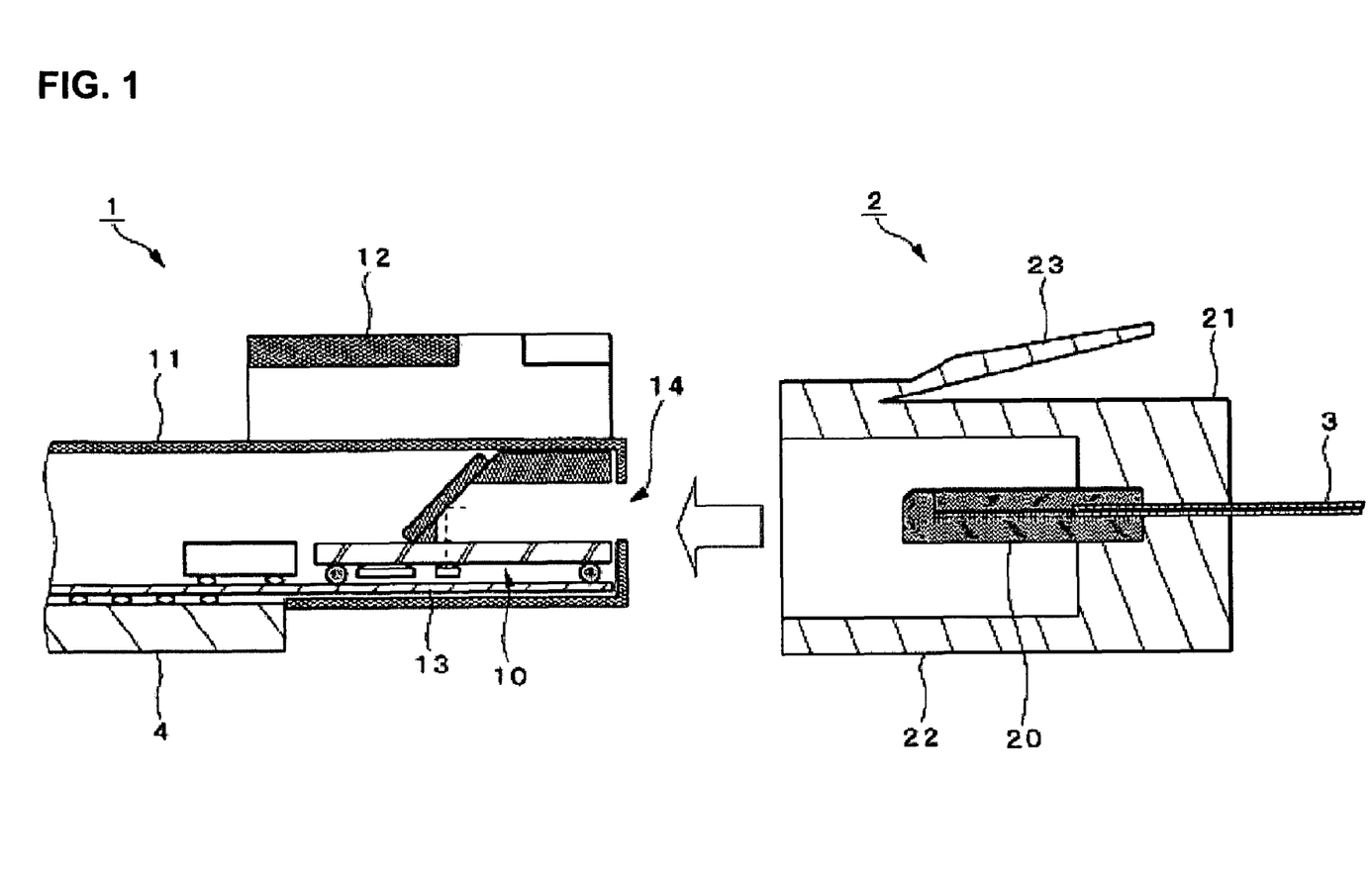
FIG. 1 shows views (cross-sectional views) for describing the structure of an optical connector in accordance with an embodiment.
Figure 2:
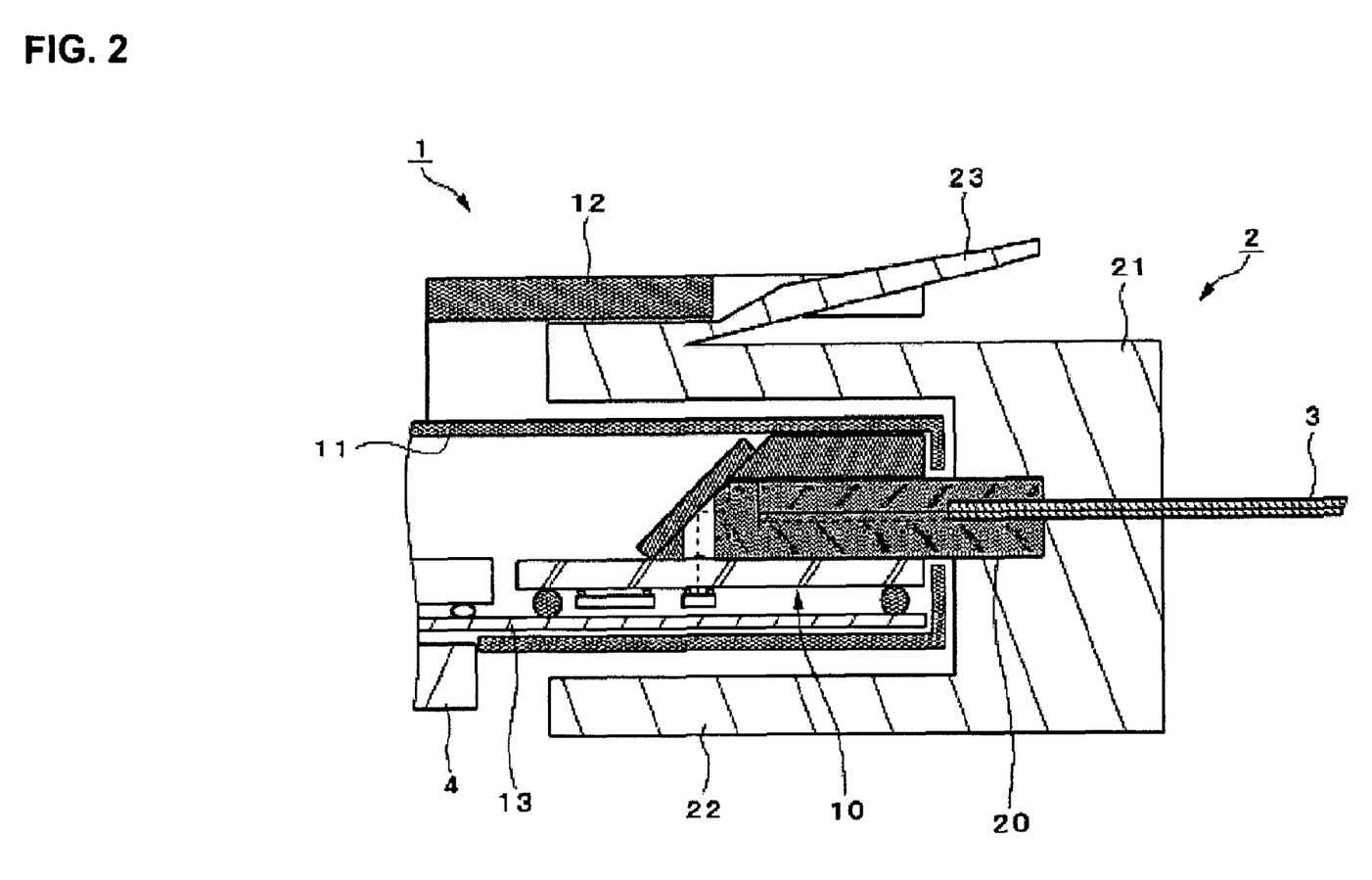
FIG. 2 shows a view for describing the state in which a female connector engages a male connector.

FIG. 1 shows views (cross-sectional views) for describing the structure of an optical connector in accordance with an embodiment of the present invention. The optical connector of the present embodiment shown in FIG. 1 is composed of a male connector 2 that supports a part of a tape fiber 3 (optical transmission medium), and a female connector 1 that is structured to be engageable with the male connector 2. Also, FIG. 2 is a view for describing the state in which the female connector 1 engages the male connector 2.

The female connector 1 includes a photoelectric conversion module 10, a housing (first housing) 11, a part to be latched 12 and a flexible wiring substrates 13, and may be mounted on an electronic equipment, such as, for example, a personal computer.

The photoelectric conversion module 10 has the function to convert an electrical signal to an optical signal and vice verse, and more specifically, has the function to convert an electrical signal into an optical signal and make the same to enter the tape fiber 3, and the function to convert an optical signal sent from another photoelectric conversion module (not shown) or the like through the tape fiber 3 into an electrical signal and output the same. The photoelectric conversion module 10 is electrically connected to a circuit board 4 of the electronic equipment. The detailed structure of the photoelectric conversion module 10 is described below.

The housing 11 accommodates the photoelectric conversion module 10, and has an aperture 14 that communicates with the photoelectric conversion module 10 accommodated therein.

The part to be latched 12 engages a latching part 23 that is a part of the housing 21 that composes the male connector 2. The state in which the male connector 2 engages the female connector 1 is maintained by the engagement of the two.

The flexible wiring substrate 13 includes wirings, and has the function that electrically connects between the photoelectric conversion module 10 and the circuit board 4. The flexible wiring substrate 13 and the photoelectric conversion module 10 or the circuit board 4 are mutually, electrically connected by solder bumps or the like.

The male connector 2 is structured to include a plug 20 provided at an end of the tape fiber 3, and a housing 21 (second housing) that accommodates the plug 20 therein.

The plug 20 has at least a part thereof (about ⅔ of the entire length in this example) that is inserted in the housing 11 of the female connector 1 through the aperture 14 described above, and has the function to optically connect the tape fiber 3 and the photoelectric conversion module 10. The detailed structure of the plug 20 is described below.

The housing 21 accommodates the plug 20, and is structured to include an enclosure part 22 provided around the plug 20 while securing a space from the plug 20 and a latching part 23 that is to be engaged with the part to be latched 12 described above.

Figure 3:
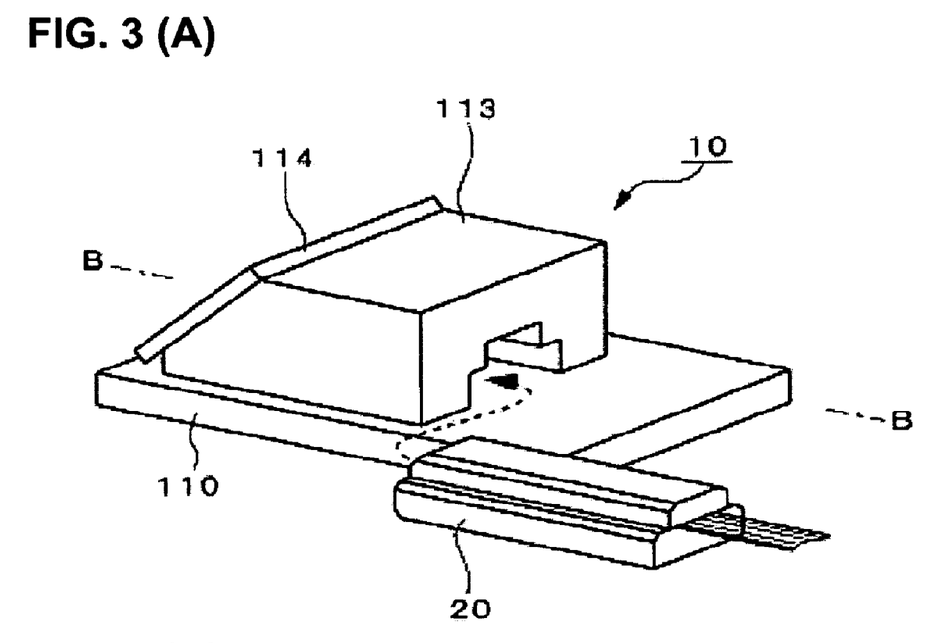

FIG. 3 are views for describing the structure of the photoelectric conversion module 10 in detail. FIG. 3(A) is a figure in which the external appearance of the photoelectric conversion module 10 is shown by a perspective view, and FIG. 3(B) is a cross-sectional view taken along lines B-B shown in FIG. 3(A). As shown in FIG. 3, the photoelectric conversion module 10 includes a transparent substrate 110, an optical element 111, a circuit chip 112, a receptacle 113, a reflector 114, and a lens 115.

The transparent substrate 110 has an optical transparency to wavelengths of the light used, and supports each element that composes the photoelectric conversion module 10. For example, when the wavelength of an optical signal emitted from the optical element 111 or an optical signal received by the optical element 111 has a value of a visible light (for example, 850 nm) or a value close to the visible light, the transparent substrate 110 may be composed of a glass or plastic material.

The optical element 111 receives the supply of a driving signal (current or voltage) from the circuit chip 112 and emits an optical signal, or generates an output signal (current or voltage) according to the intensity of an optical signal received through the transparent substrate 110, and is disposed at a predetermined position on one surface side of the transparent substrate 110 with its light emission side or light reception side facing toward the side of the transparent substrate 110. For example, a light emission element such as a VCSEL (surface-emitting laser) is enumerated as the optical element 111 that is used on the information transmission side, and a light detecting element such as a photodiode is enumerated as the optical element 111 that is used on the information receiving side.

The circuit chip 112 includes a driver for driving the optical element 111 and the like, and is disposed at a predetermined position on the one surface side of the transparent substrate 110. The circuit chip 112 is connected to the optical element 111 through a wiring film (not shown) formed on the transparent substrate 110, and may be further connected to other circuit elements and circuit chips (not shown) if necessary. The circuit chip 112 has the function that controls the emission of the optical element 111 according to an electrical signal that is sent from the circuit substrate 4 of the electronic equipment such as a personal computer, and received through the flexible substrate 13, and the function that generates (restores) an electrical signal that can be received by the electronic equipment according to an output signal (current or voltage) from the optical element 111. It is noted that the optical element 111 may be equipped with the functions of the circuit chip 112, and the circuit chip 112 can be omitted in such a case.

A receptacle (socket) 113 is provided with a bore that is to be engaged with the plug 20 of the male connector 2, and is disposed on the other surface side of the transparent substrate 110 so that the engagement bore communicates with the aperture 14 of the female connector 1. The receptacle 113, in which the plug 20 is to be inserted, has the function to optically couple one end of the tape fiber 3 supported by the plug 30 to the optical element 111, and is formed from, for example a glass and plastic material.

The reflector 114 is mounted on the receptacle 113, disposed on the other surface side of the transparent substrate 110, and has the function to change the course of an optical signal emitted from the optical element 111 by about 90 degrees to be conducted to the tape fiber 3, or to change the course of an optical signal emitted from the tape fiber 3 by about 90 degrees to be conducted to the optical element 111. The reflector 114 is arranged at an angle of about 45 degrees with respect to the optical axis of the optical element 111 (main propagation direction of the optical signal).

The lens 115 has the function to focus the optical signal emitted from the optical element 111 and lead the same to the reflector 114, or to focus an optical signal emitted from the tape fiber 3 and reflected by the reflector 114 and lead the same to the optical element 111.

Figure 4:
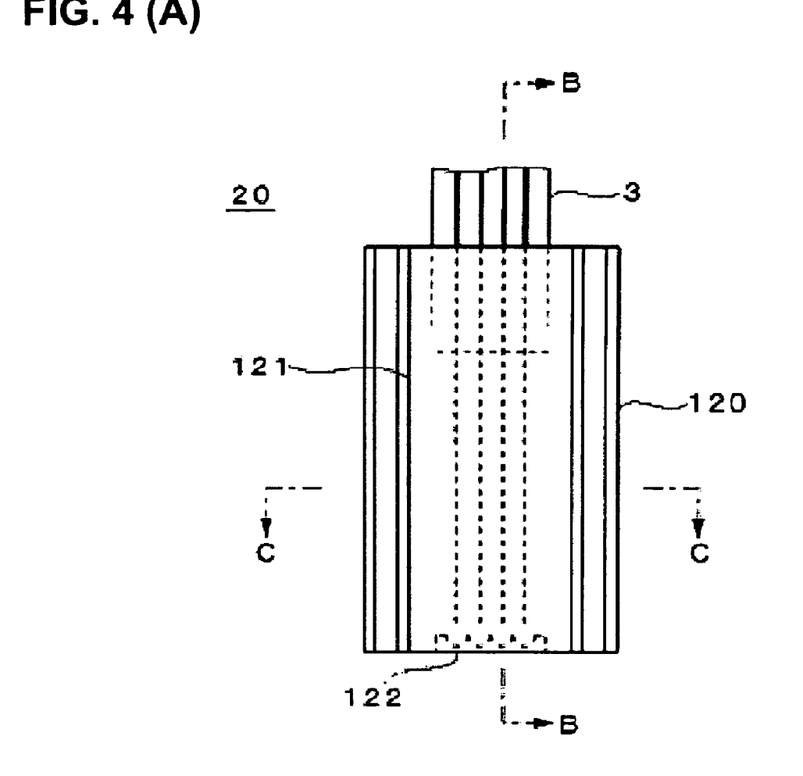
FIGS. 4(A)–(C) show views for describing the structure of a plug in detail.

FIG. 4 are views for describing the structure of the plug 20 in detail. FIG. 4(A) is a plan view in which the plug 20 is seen from an upper side thereof, FIG. 4(B) is a cross-sectional view taken along lines B-B shown in FIG. 4(A), and FIG. 4(C) is a cross-sectional view taken along lines C-C shown in FIG. 4(A).

The plug 20 includes a base 120, an upper plate 121, and a plurality of lenses 122, as shown in FIGS. 4. As shown in FIG. 4(C), the plug 20 has a structure in which fiber cores of the tape fiber 3 are disposed along v-shaped grooves of the base 121, and the upper plate 121 is disposed on the upper side thereof, thereby sandwiching the fiber cores between the upper plate 121 and the base 120. Four lenses 122 are formed in one piece with the base 120, and disposed so that each of the fiber cores generally concurs with the optical axis.

In this manner, because the optical connector of the present embodiment achieves an optical coupling through the plug and the like, the ends of the fiber cores of the tape fiber 3 are not required to be polished in high accuracy, such that an increase in the cost due to a decrease in the yield can be avoided. Moreover, because guide pins are not used for position adjustment between the female and made connectors, the number of parts is reduced, and the step of forming the guide pins becomes unnecessary, whereby an increase in the cost can be avoided. Therefore, low-cost optical connectors that are readily adopted for electronic equipments of household use can be provided.

Next, examples of the optical connector in other structures are described.

Figure 5:
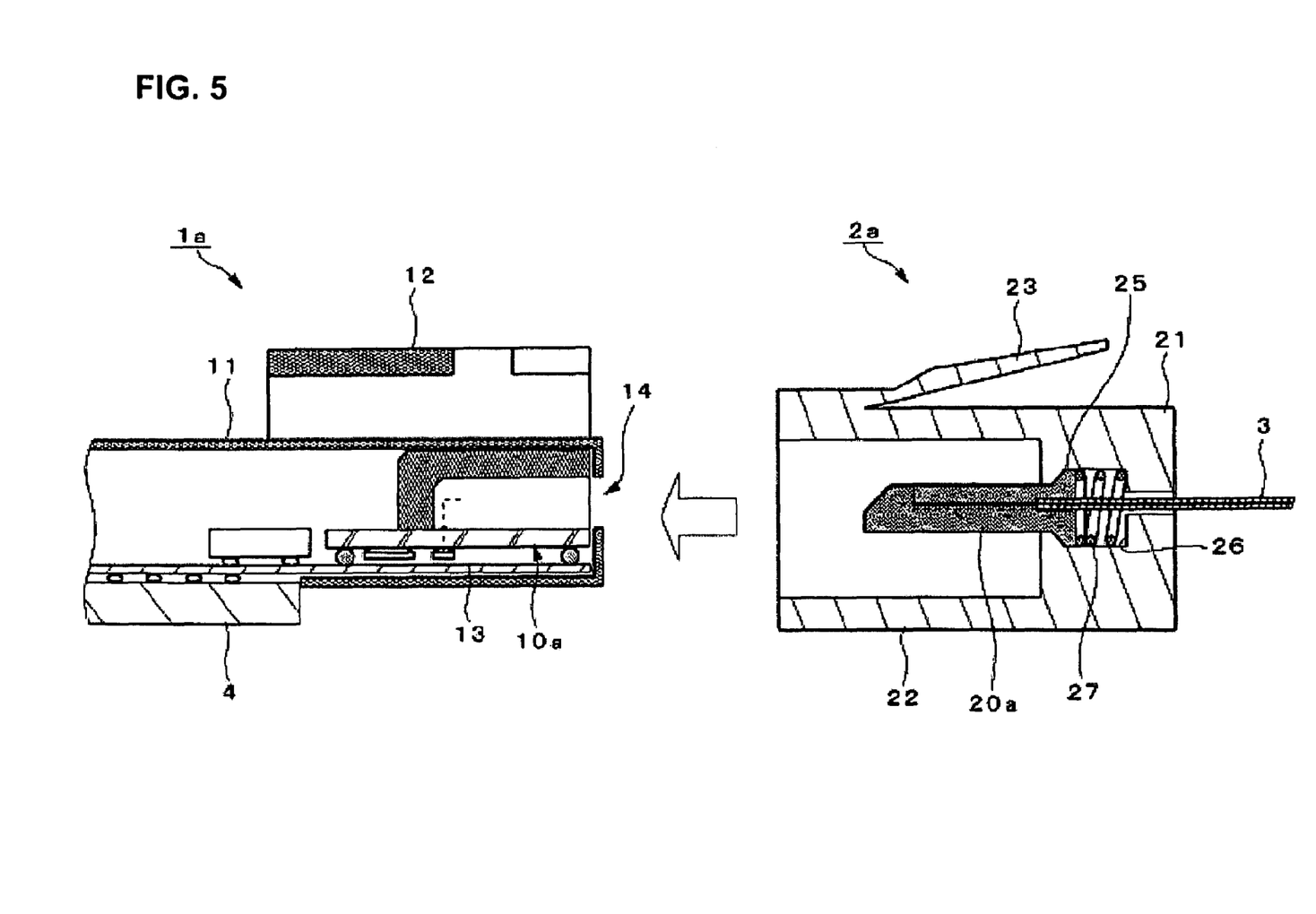
FIG. 5 shows views (cross-sectional views) for describing another example (No. 1) of the structure of an optical connector.

FIG. 5 shows views (cross-sectional views) for describing another example (No. 1) of the structure of the optical connector. The optical connector shown in FIG. 5 is composed of a male connector 2a that supports a part of a tape fiber (optical transmission medium) 3, and a female connector 1 that is formed to be engageable with the male connector 2a.

Figure 6:
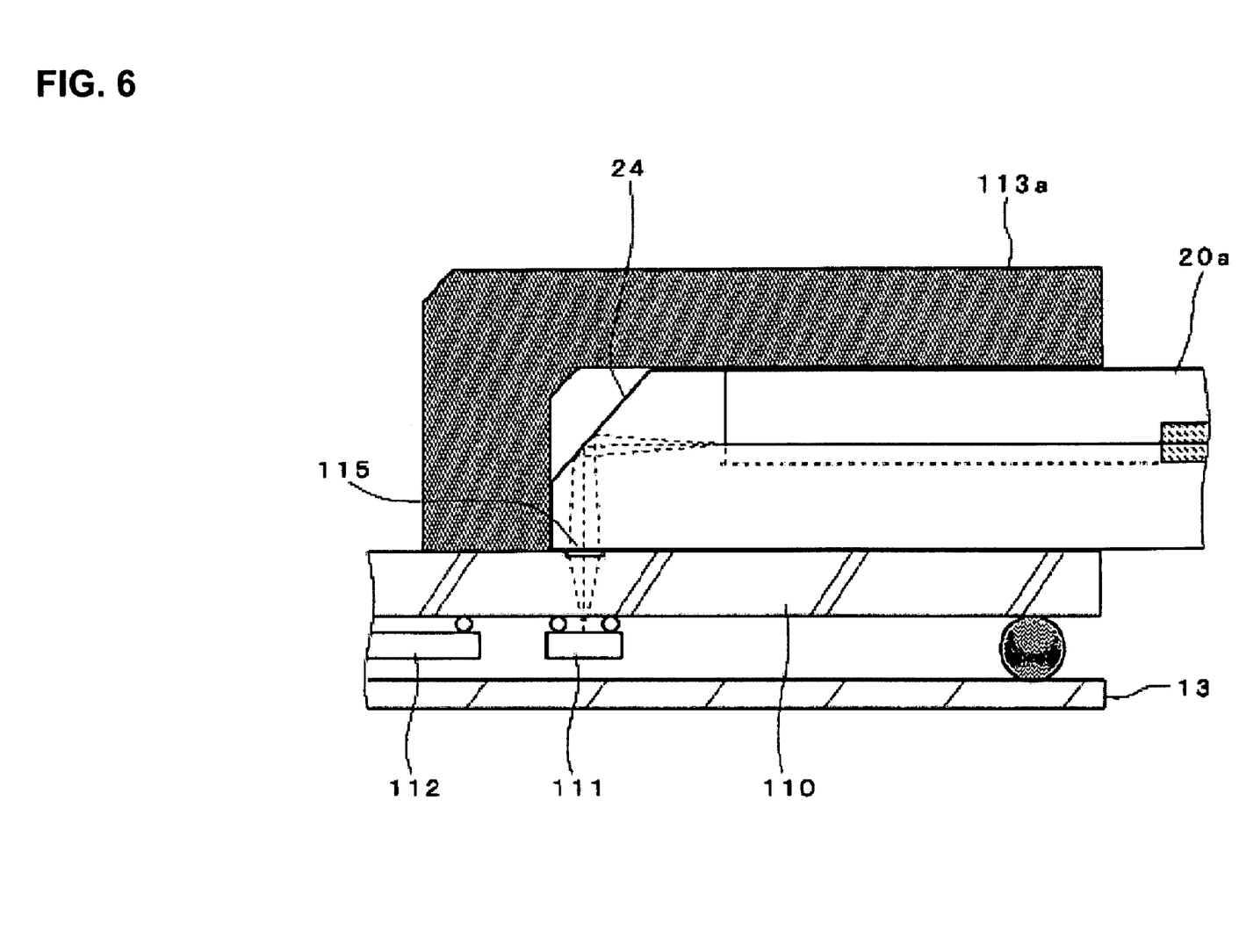
FIG. 6 shows a partially enlarged view for describing an optical coupling state in which a female connector engages a male connector.

Also, FIG. 6 is a partially enlarged view for describing an optical coupling state in which the female connector 1a engages the male connector 2a. The optical connector shown in each of the figures has a structure that is basically similar to that of the optical connector in the embodiment described above with reference to FIG. 1. Components that are common to the two are appended with the same signs and their detailed descriptions are omitted.

As for the female connector 1a, the structure of a photoelectric conversion module to be accommodated therein is different from the female connector 1 of the above-described embodiment. Concretely, the photoelectric conversion module 10a built in the female connector 1a is not provided with a reflector, such that the structure of a receptacle becomes different accordingly. The receptacle 113a of this example is provided with a bore that is to be engaged with a plug 20a of the male connector 2a, and is disposed on the other surface side of the transparent substrate 110 in a manner that the engagement bore communicates with an aperture 14 of the female connector 1a. The receptacle 113a has a surface arranged perpendicular to a direction in which the plug 20a is inserted. When the plug 20a is inserted, it is positioned as the end of the plug 20a abuts against the perpendicular surface.

As for the male connector 2a, the structure of the plug to be accommodated is different from the embodiment described above in that the plug is structured to be moveable back and fourth along the optical axis of the tape fiber 3. Concretely, the plug 20a of the present example is provided with a reflection part 24 that is formed on one end side thereof on the optical axis of tape fiber 3, and a flange part 25 on the other end side.

The reflection part 24 is disposed on the optical axis of the tape fiber 3, and has the function to change the course of an optical signal emitted from the tape fiber 3 by about 90 degrees to conduct the same to the optical element 111, or to change the course of an optical signal emitted from the optical element 111 by about 90 degrees to conduct the same to the tape fiber 3. By this structure, the traveling direction of the optical signal that travels in and out between the plug 20a and the photoelectric conversion module 10a and the insertion/removal direction of the plug 20a become generally orthogonal to each other, such that a structure in which the optical signal does not go out from the plug 20a and the photoelectric conversion module 10a can be obtained. This structure is desirable particularly from the viewpoint of protection of eyes (eye safety), and therefore suitable for applications to household electronic appliances.

The flange part 25 is arranged within a bore 26 provided on the side of the male connector 2a, and is structured to be moveable back and forth within the range of the bore 26. By this, the plug 20a is structured to be moveable back and forth along the optical axis of the tape fiber 3. Also, within the bore 26 of the male connector 2a is arranged a spring 27 as a force application device that forces the plug 20a toward the receptacle of the female connector 1a. By these structures, the plug 20a is placed substantially in a floating state, such that external forces that may act on the tape fiber 3 and the main body (housing 21) of the male connector 2a become difficult to transmit to the plug 20a. In other words, in the present example, a so-called pull-proof structure is adopted. Moreover, because the force is applied to the plug 20a by the spring 27, the plug 20a and the photoelectric conversion module 10a on the side of the female connector 1a can be accurately positioned, and its state can be stably maintained.

Figure 7:
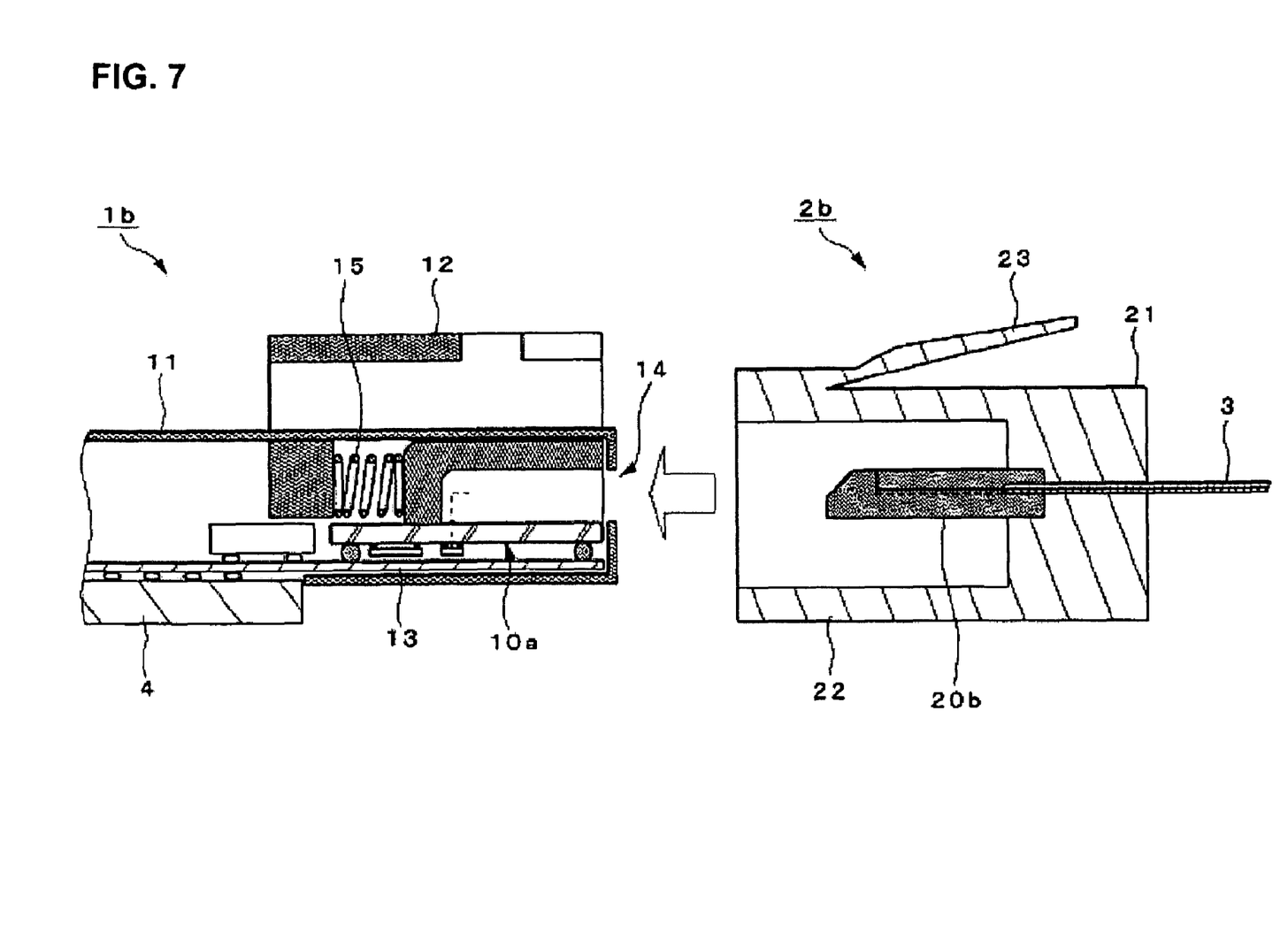
FIG. 7 shows views (cross-sectional views) for describing another example (No. 2) of the structure of an optical connector.

FIG. 7 shows views (cross-sectional views) for describing another example (No. 2) of the structure of the optical connector. The optical connector shown in FIG. 7 has a structure that is basically similar to that of the optical connector of the structural example shown in FIG. 5 described above. Components that are common to the two are appended with the same signs and their detailed descriptions are omitted.

This structural example is different from the structural example described above with reference to FIG. 5 in that a spring as a force application device is provided on the side of a female connector. Concretely, a female connector 1b of this example is provided with a spring 15 that applies a force to a photoelectric conversion module 10a. A spring as a force application device is omitted in a male connector 2b, and a plug 20b is directly mounted on a housing 21. By these structures, the photoelectric conversion module 10a is placed substantially in a floating state, such that external forces that may act on the tape fiber 3 and the main body (housing 21) of the male connector 2b become difficult to transmit to the plug 20b. Moreover, because the force is applied to the photoelectric conversion module 10a by the spring 15, the plug 20b and the photoelectric conversion module 10a can be accurately positioned, and its state can be stably maintained.

It is noted that the present invention is not limited to the contents of the embodiments described above, and a variety of modified embodiments can be made within the scope of the subject matter of the present invention.

What is claimed is:

1. An optical connector comprising:
 a female connector comprising:
  a photoelectric conversion module that converts an electrical signal and an optical signal;
  a first housing that accommodates the photoelectric conversion module;
  an opening in the first housing that communicates with the photoelectric conversion module; and
  an optical element that at least one of transmits and receives the optical signal;
 a male connector that supports one end of an optical transmission medium and cooperates with the female connector, the male connector comprising:
  a plug adapted to be received by the first housing to optically connect the optical transmission medium and the photoelectric conversion module; and
  a second housing having an enclosure section extending around the plug and defining a space between the plug and the second housing, the second housing extends around the optical element of the female connector when the male connector and the female connector are in engagement with each another;
 wherein the photoelectric conversion module includes:
 a transparent substrate that has an optical transparency for wavelengths of the optical signal;
 the optical element is disposed at one surface side of the transparent substrate and emits the optical signal to another surface side of the transparent substrate in response to a supply of a current or a voltage, or outputs a current or a voltage according to an intensity of the optical signal that enters the transparent substrate from the other surface side;
 a reflector disposed on the other surface side of the transparent substrate and changes a course of the optical signal emitted from the optical element by about 90 degrees to be conducted to the optical transmission medium, or changes a course of the optical signal emitted from the optical transmission medium to be conducted to the optical element; and
 a receptacle disposed on the other surface side of the transparent substrate for inserting the plug.

2. An optical connector according to claim 1, wherein the photoelectric conversion module further includes a lens that focuses the optical signal emitted from the optical element to be conducted to the reflector, or that focuses the optical signal emitted from the optical transmission medium and reflected by the reflector to be conducted to the optical element.

3. An optical connector according to claim 1, wherein the plug further includes a lens that focuses the optical signal emitted from the optical element and reflected by the reflector to be conducted to the optical transmission medium, or that focuses the optical signal emitted from the optical transmission medium to be conducted to the reflector.

4. An optical connector comprising:
 a female connector comprising:
  a photoelectric conversion module that converts an electrical signal and an optical signal;
  a first housing that accommodates the photoelectric conversion module;
  an opening in the first housing that communicates with the photoelectric conversion module; and an optical element that at least one of transmits and receives the optical signal;

a male connector that supports one end of an optical transmission medium and cooperates with the female connector, the male connector comprising:

a plug adapted to be received by the first housing to optically connect the optical transmission medium and the photoelectric conversion module; and a second housing having an enclosure section extending around the plug and defining a space between the plug and the second housing, the second housing extends around the optical element of the female connector when the male connector and the female connector are in engagement with each another;

wherein the plug includes a reflection section disposed on an optical axis of the optical transmission medium, and changes a course of the optical signal emitted from the optical transmission medium by about 90 degrees to be conducted to the optical element, or changes a course of the optical signal emitted from the optical element to be conducted to the optical transmission medium;

the photoelectric conversion module includes a transparent substrate that has an optical transparency for wavelengths of the optical signal;

the optical element is disposed at one surface side of the transparent substrate, and emits the optical signal to another surface side of the transparent substrate in response to a supply of a current or a voltage, or outputs a current or a voltage according to an intensity of the optical signal that enters the transparent substrate from the other surface side; and a receptacle disposed on the other surface side of the transparent substrate for inserting the plug.

5. An optical connector according to claim 4, wherein the male connector is moveable reciprocally along the optical axis of the optical transmission medium, and further includes a force application device that applies a force to the plug toward the receptacle of the female connector.

* * * * *